March 18, 1930.   J. HREN   1,750,842
FISHING TACKLE
Filed Aug. 31, 1926
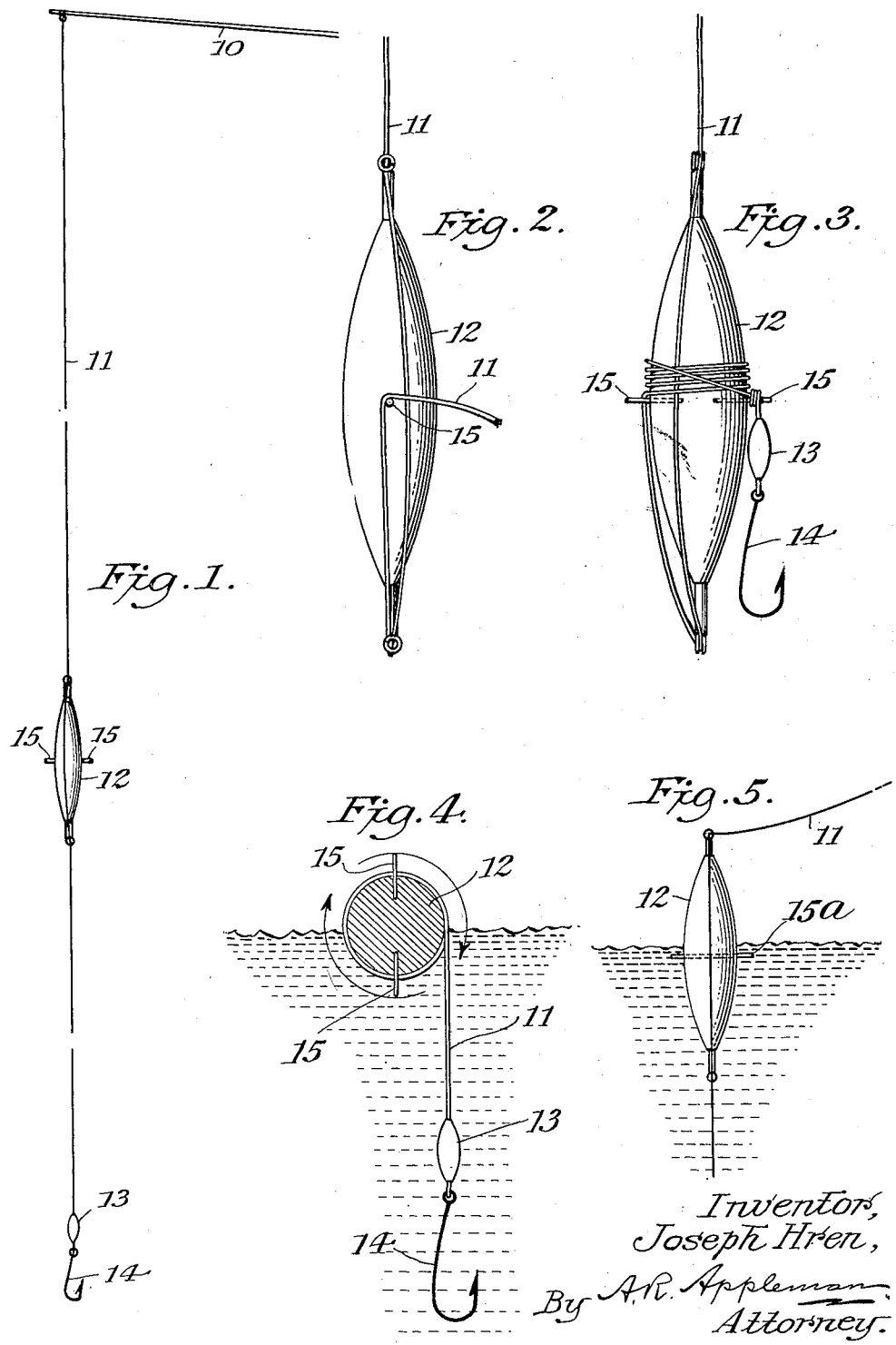
Inventor,
Joseph Hren,
By A.R. Appleman
Attorney.

Patented Mar. 18, 1930

1,750,842

UNITED STATES PATENT OFFICE

JOSEPH HREN, OF KINGSTON, NEW YORK

FISHING TACKLE

Application filed August 31, 1926. Serial No. 132,700.

This invention relates to improvements in fishing tackle, more particularly to the sort employed in float fishing in still waters, such as lakes, rivers, ponds, bays and breakwater protected areas along the sea coast.

An object of the invention is to provide means for facilitating the cast for distance in float carried fishing lines. Briefly expressed, the invention involves an improved float having means on which the hook end of the line may be coiled.

As is well known, the usual result in casting a line with a float attached is an unsatisfactory distance, or more discouraging, a tangled line.

A feature of the invention resides in a float having laterally projecting pins on which the extreme end portion of the hook end of the line may be coiled in such relation that when the float strikes the water it will at once assume a horizontal position, after which the sinker, by the action of gravitation will move downwardly in the water thus twirling the float on the water and draw the line down with the hook, and when fully unwound the weight of the sinker will stand the float upright in the water with the hook in close proximity to the bottom of the river, lake or other body of water.

I clearly illustrate my invention in the accompanying drawing, which forms part of this specification, and in which drawing similar reference characters are employed to designate corresponding parts throughout the several views in which :—

Figure 1 is a side view showing a portion of a pole and a fishing line on which is carried my improved float.

Fig. 2 is an enlarged detail view of the float showing how the hook end of the line is brought up and over a pin on the float before coiling it around the same.

Fig. 3 is a somewhat similar view, but showing the hook end of the line fully coiled on the float and around a pin ready for casting.

Fig. 4 is a sectional view through the float at near its center and indicating by arrows how the weight of the hook and sinker twirls or rotates said float on the water to unwind the hook end of the line therefrom.

Fig. 5 is a reduced detail view showing the position of the float when the hook end of the line is entirely unwound, the hook and sinker being held suspended in the water above the river bottom and acting to tilt the float to an upright position.

Referring to the drawings the tip end of the rod is shown at 10, to which may be attached a line 11, which is passed through the usual adjusting clips of a float 12, and provided as usual, with a sinker 13, arranged as here shown just above the hook 14.

The improved float may carry outwardly projecting headless pins 15, varying in number, in some instances it might be advantageous to provide a relatively long pin $15^a$ extending entirely through the float and projecting at the opposite sides to provide a pair of such pins, as indicated in Fig. 5, or shorter pins may be employed, one or more, partially driven into the float to provide the requisite number of projective pins as desired.

It has been found by practical tests that a single pin projecting from the mid-portion of the float will be ample for carrying out my invention but owing to the varying adjustments required of the hook end of the fishing line with respect to varying depths of water encountered when fishing for bottom or mid-depth fish, it is desirable to employ at least two projecting pins, so that the extreme hook end of the line may be conveniently coiled on a nearby pin for the casting operation, and to obtain the desired placement or position of the hook relative to the bottom of the river, lake or other body of water.

What I claim as new and desire to secure by Letters Patent is:—

An article of manufacture comprising a fishing float, loops at the ends thereof and centrally arranged headless pins projecting from the sides of said float in opposite alignment.

In testimony whereof, I have signed my name to this specification this 13th day of August, 1926.

JOSEPH HREN.